United States Patent
Kwon et al.

(10) Patent No.: US 8,849,240 B2
(45) Date of Patent: Sep. 30, 2014

(54) SYSTEM AND METHOD FOR PERFORMING EMERGENCY CALL IN WIRELESS COMMUNICATION NETWORK, AND BASE STATION

(75) Inventors: Il Won Kwon, Ansan-si (KR); Jung Hee Han, Seoul (KR); Sang Min Lee, Seoul (KR); Chan Ho Min, Seoul (KR)

(73) Assignee: Samsung Electronics Co., Ltd (KR)

( * ) Notice: Subject to any disclaimer, the term of this patent is extended or adjusted under 35 U.S.C. 154(b) by 117 days.

(21) Appl. No.: 13/055,636

(22) PCT Filed: Jul. 23, 2009

(86) PCT No.: PCT/KR2009/004110
§ 371 (c)(1),
(2), (4) Date: Jan. 24, 2011

(87) PCT Pub. No.: WO2010/011094
PCT Pub. Date: Jan. 28, 2010

(65) Prior Publication Data
US 2011/0124312 A1    May 26, 2011

(30) Foreign Application Priority Data
Jul. 24, 2008  (KR) .................. 10-2008-0072112

(51) Int. Cl.
*H04W 76/00*  (2009.01)
*H04W 4/22*  (2009.01)
*H04W 28/04*  (2009.01)
*H04W 88/04*  (2009.01)
*H04W 72/08*  (2009.01)

(52) U.S. Cl.
CPC ............... *H04W 4/22* (2013.01); *H04W 28/04* (2013.01); *H04W 76/007* (2013.01); *H04W 88/04* (2013.01); *H04W 72/082* (2013.01)
USPC .................... 455/404.2; 455/404.1; 455/11.1; 455/13.1; 455/63.1; 455/502

(58) Field of Classification Search
USPC ......... 455/404.1, 404.2, 11.1, 13.1, 63.1, 502
See application file for complete search history.

(56) References Cited

U.S. PATENT DOCUMENTS

| | | | |
|---|---|---|---|
| 7,937,068 B2 * | 5/2011 | Hogberg et al. | 455/404.2 |
| 2005/0197096 A1 | 9/2005 | Yang et al. | |
| 2006/0009191 A1 * | 1/2006 | Malone, III | 455/404.1 |
| 2007/0066276 A1 | 3/2007 | Kuz et al. | |
| 2007/0129076 A1 | 6/2007 | Cho et al. | |

FOREIGN PATENT DOCUMENTS

JP    2004015119    1/2004

* cited by examiner

*Primary Examiner* — Sharad Rampuria
*Assistant Examiner* — Sayed T Zewari
(74) *Attorney, Agent, or Firm* — The Farrell Law Firm, P.C.

(57) ABSTRACT

A system and method for performing an emergency call is disclosed that can reduce inter-cell interference. A wireless communication system for performing an emergency call includes an emergency call mobile station for requesting the emergency call; a relay mobile station for relaying the emergency call request to a serving base station; a serving base station for receiving the emergency call request via the relay mobile station, determining an emergency call transmission resource, and requesting its ambient base stations so as not to use the determined emergency call transmission resource; and ambient base stations for preventing the use of the area of the transmission resource, to which the emergency call transmission resource is allocated.

32 Claims, 3 Drawing Sheets

SYSTEM AND METHOD FOR PERFORMING EMERGENCY CALL IN WIRELESS COMMUNICATION NETWORK, AND BASE STATION

PRIORITY

This application claims priority to International Appl. No.: PCT/KR2009/004110 filed Jul. 23, 2009, and to Korean Patent Application No. 10-2008-0072112 filed on Jul. 24, 2008, the disclosure of each which is hereby incorporated by reference.

TECHNICAL FIELD

The present invention relates to communication systems. More particularly, this invention relates to a wireless communication system that can reduce inter-cell interference that may be caused by ambient base stations when emergency communication is performed, and to a method for performing emergency communication therein.

BACKGROUND ART

In general, a mobile station can be communicated with a base station, synchronizing therewith. If a specific mobile station is located out of cell coverage of the base station or in a cell coverage hole of the base station, it can be communicated with the base station. In this situation, if it is necessary to request emergency communication, the mobile station can access the base station via another mobile station. This method is called peer to peer (P2P) communication where mobile stations can directly communicate with each other in a wireless cellular communication system.

In a conventional wireless cellular communication system, although two mobile stations (MS) in the same cell coverage are relatively very close to each other, they can communicate with each other only via a base station (BS). However, it is preferable that the two mobile stations in the same cell coverage can directly communicate with each other rather than via a base station, if they are relatively very close to each other.

If direct communication is performed by two mobile stations, it may not be smoothly performed due to interference of other mobile stations or of a base station adjacent to the corresponding base station. In that case, a system and method is required to remove such interference.

DISCLOSURE OF INVENTION

Technical Problem

The present invention solves the above problems, and provides a wireless communication system and can remove electromagnetic wave interference that may caused by ambient base stations when an emergency call or emergency communication is performed, and a method for performing an emergency call or emergency communication in the wireless communication system.

Technical Solution

In accordance with an exemplary embodiment of the present invention, a, the present invention provides a wireless communication system for performing an emergency call, including: an emergency call mobile station for requesting the emergency call; a relay mobile station for relaying the emergency call request and communicating with the emergency call mobile station using an allocated emergency call transmission resource; and a serving base station for receiving the emergency call request via the relay mobile station, allocating the emergency call transmission resource, requesting its ambient base stations so as not to use the allocated emergency call transmission resource, and notifying the relay mobile station of the allocated emergency call transmission resource.

Preferably, the emergency call transmission resource is one of a plurality of subframes. The relay mobile station and the emergency call mobile station divide the one sub-frame into up link and down link slots and perform the emergency through using the up link and down link slots.

In accordance with another exemplary embodiment of the present invention, the present invention provides a method for performing an emergency call in a wireless communication system, including: relaying, by a relay mobile station, an emergency call requested by an emergency call mobile station and transmitting it to a serving base station; receiving, by the serving base station, the emergency call request, allocating an emergency call transmission resource, and requesting its ambient base stations so as not to use the allocated emergency call transmission resource; and allocating, by the serving base station, the emergency call transmission resource to the relay mobile station, and performing an emergency call service.

Preferably, the emergency call transmission resource is one of a plurality of subframes. Preferably, performing an emergency call service includes: dividing, by the relay mobile station and the emergency call mobile station, the one sub-frame into up link and down link slots; and perform the emergency through using the up link and down link slots.

In accordance with another exemplary embodiment of the present invention, the present invention provides a method for performing emergency communication in a base station, including: receiving an emergency call request and allocating an emergency call transmission resource; requesting ambient base stations so as not to use the allocated emergency call transmission resource; and receiving a signal in response to the request that the ambient base stations do not use the allocated emergency call transmission resource, and providing an emergency call service using the allocated emergency call transmission resource.

Preferably, the emergency call transmission resource is one of a plurality of subframes.

Advantageous Effects

As described above, according to the present invention, the serving base station receives an emergency call request and allocates transmission resource for an emergency call (called 'emergency call transmission resource'), so as not to use the allocated emergency call transmission resource in ambient base stations, thereby preventing interference among cells when an emergency call is performed. Therefore, the serving station can smoothly perform an emergency call.

BRIEF DESCRIPTION OF DRAWINGS

The features and advantages of the present invention will become more apparent from the following detailed description in conjunction with the accompanying drawings, in which.

MODE FOR THE INVENTION

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

In the following description, the wireless communication system according to the present invention is first explained detail with reference to the accompanying drawings.

Figure 1:
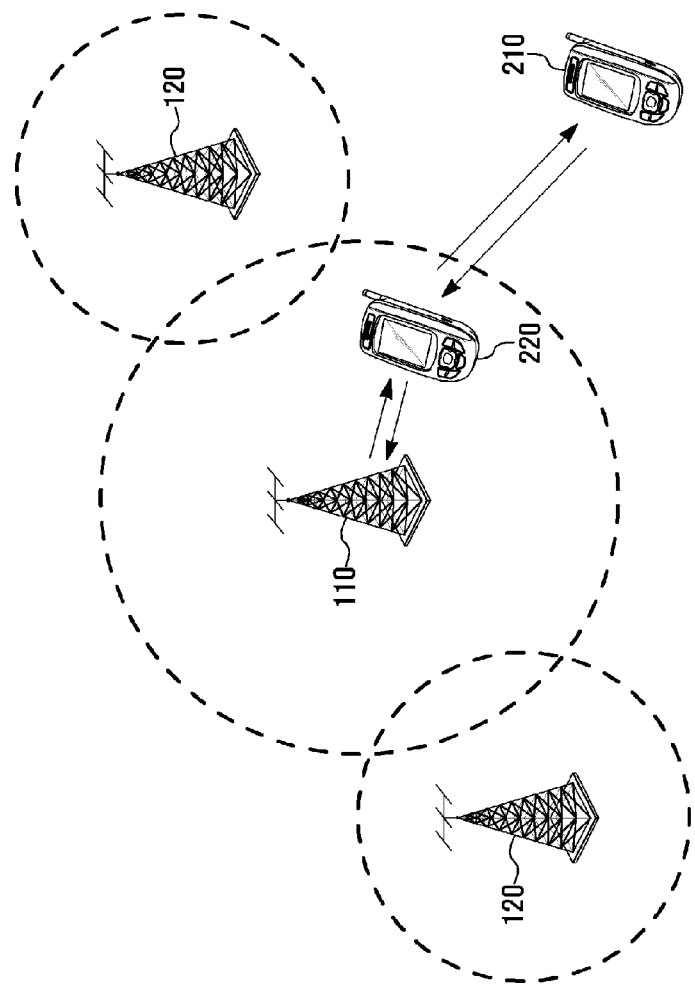
FIG. 1 is a view describing a wireless communication system for an emergency call, according to an embodiment of the present invention.

FIG. 1 is a view describing a wireless communication system for an emergency call, according to an embodiment of the present invention. It is assumed that the wireless communication system according to the present invention is a cellular wireless communication system including a variety of cells.

As shown in FIG. 1, in the wireless communication system there are a plurality of base stations 110 and 120, cells as service areas of respective base stations 110 and 120, and a plurality of mobile stations 210 and 220. If mobile stations are out of the cells or in a coverage hole in the cells, they may not use services of the base stations 110 and 210. Since such mobile stations cannot receive a preamble from any of the base stations 110 and 210 in the wireless communication system, they cannot access the base stations 110 and 210, which is called an emergency situation.

For example, as shown in FIG. 1, if the mobile station 210 is in an emergency situation, it can access the base station 110 via the mobile station 220 in the cell.

In order to clearly describe the present invention, a mobile station is hereinafter called an emergency caller (EC) 210 that cannot directly access a service from any of the base stations 110 and 210 and thus can access a base station 110 through the other mobile station 220. In that case, the mobile station 220 is called a relay mobile station that relays communication between the emergency caller 210 and the base station 110. In addition, the base station 110 is called a serving base station of the relay mobile station 220 that provides an emergency call service to the emergency caller 110 through the relay mobile station 220. The base station 120 is also called an ambient base station of the serving base station.

As described above, the wireless communication system for proving an emergency call service, according to an embodiment of the present invention, includes an emergency caller 210 for requesting an emergency call, a relay mobile station 220 for relaying the emergency call request, a serving base station 110 for receiving the emergency call request from the relay mobile station 220 and providing an emergency call service, and an ambient base station 120 that does not use a specific transmission resource by the request of the serving base station 110.

The emergency caller 210 refers to a mobile station that is not located in a service area of any of the base stations in a wireless communication system and thus requests an emergency call. The emergency caller 210 transmits a signal requesting an emergency call service through a synchronization channel (SCH) to ambient mobile stations. The signal requesting an emergency call service is hereinafter called an emergency call requesting signal E_call_req.

The relay mobile station 220 refers to a mobile station that receives an emergency call requesting signal E_call_req, and transmits a signal for relaying the emergency call requesting signal E_call_req through a ranging request channel (RRC) to the serving base station 110. The signal for relaying the emergency call requesting signal E_call_req is hereinafter called an emergency call request relaying signal E_call_relaying_req.

The emergency caller 210 transmits an emergency call requesting signal E_call_req to all ambient mobile stations. Therefore, the relay mobile stations of the emergency caller 110 may increase in number.

The emergency caller 210 is communicated with the relay mobile station 220 via a transmission resource allocated by the serving base station 110 of the relay mobile station 220. The relay mobile station 220 connects the emergency caller 210 and the serving base station 110 through this transmission resource.

The serving base station 110 of the relay mobile station 220 receives an emergency call request relaying signal E_call_relaying_req from the relay mobile station 220 and identifies the emergency caller 210. In order to provide an emergency call service, the serving base station 110 allocates a transmission resource for an emergency call, which is hereinafter called an emergency call transmission resource. This emergency call transmission resource may be designated in a part of areas of the transmission resource. The emergency call transmission resource may also be designated in any section in an up link or down link. This will be described in detail as follows.

The serving base station 110 transmits a guard cell requesting signal Guard_cell_req to the ambient base station 120 so as not to cause inter-cell interference in frame areas allocated in an emergency call transmission resource.

If the ambient base station 120 uses the same emergency call transmission resource that is allocate by the serving base station 110 to provide an emergency call service, inter-cell interference occurs and thus the serving base station 110 cannot smoothly provide an emergency call service. To prevent this problem, the guard cell requesting signal Guard_cell_req is employed so that the serving base station 110 requests the ambient base station 120 not to use a transmission resource that is identical to the allocated emergency call transmission resource. It is preferable that the guard cell is coincident with a frame allocated to an emergency call transmission resource.

The ambient base station 120 refers to a base station whose cell is adjacent to the cell of the serving base station 110. It receives a guard cell requesting signal Guard_cell_req from the serving base station 110 and does not use a frame section of a transmission resource corresponding to the guard cell requesting signal Guard_cell_req.

In the following description, the emergency call transmission resource is explained in detail with reference to FIG. 2, FIG. 3 and FIG. 4.

Figure 2:
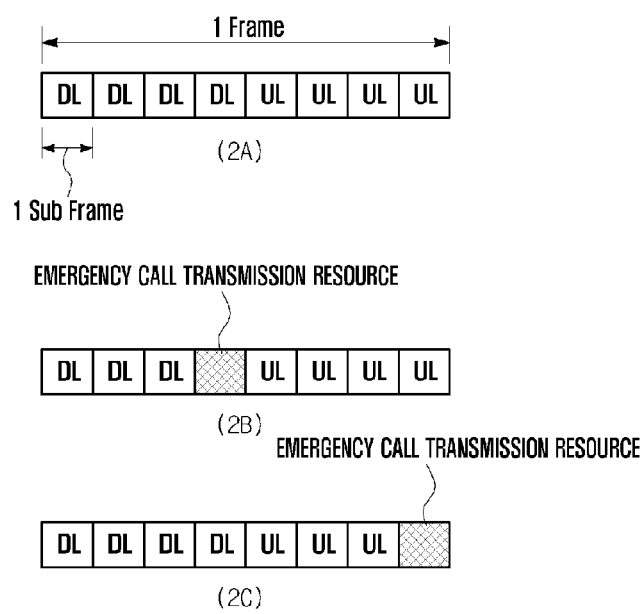
FIG. 2 shows transmission resources according to an embodiment of the present invention.

FIG. 2 shows transmission resources according to an embodiment of the present invention.

Referring to 2A, it is assumed that one frame is composed of 8 sub-frames, four of which are up link (UL) frames and remaining four of which are down link (DL) frames.

In an embodiment of the present invention, the emergency call transmission resource may be one of 8 sub-frames. For example, the emergency call transmission resource may be allocated to one of the up link frames as shown in 2B or to one of the down link frames as shown in 2C.

Figure 3:
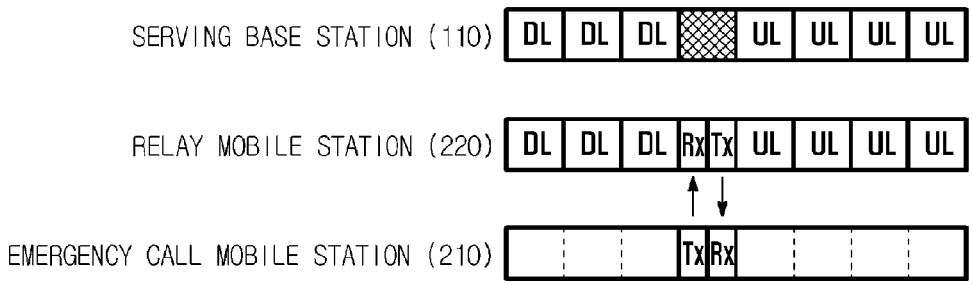
FIG. 3 shows transmission resources according to an embodiment of the present invention.

FIG. 3 shows transmission resources according to an embodiment of the present invention.

As shown in FIG. 3, if the serving base station 110 allocates an emergency call transmission resource to the fourth sub-frame, the relay mobile station 220 and the emergency caller 210 are communicated with each other using the allocated emergency call transmission resource. The fourth sub-frame is divided into two sections one of which is for transmission and other of which is for reception. For example, the relay mobile station 220 may use the divided two sections of the fourth sub-frame as a transmission slot Tx and a reception slot Rx, in order. Accordingly, the emergency caller 210 may use the divided two sections of the fourth sub-frame as a reception slot Rx and a transmission slot Tx, in order.

Consequently, in an embodiment of the present invention, if one of the sub-frames is used as a transmission resource for an emergency call, it can be divided into up and down slots between the relay mobile station 220 and the emergency caller 210.

Figure 4:
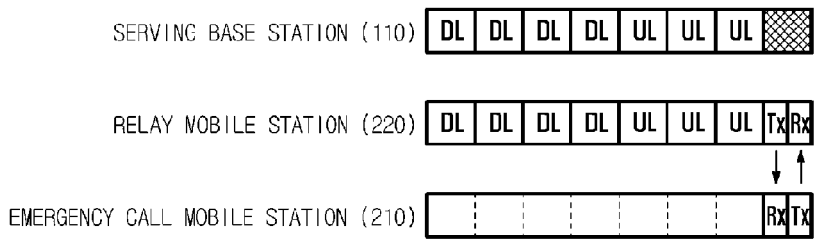
FIG. 4 shows transmission resources according to an embodiment of the present invention.

FIG. 4 shows transmission resource according to an embodiment of the present invention.

As shown in FIG. 4, if the serving base station 110 allocates an emergency call transmission resource to the eighth sub-frame, the relay mobile station 220 and the emergency caller 210 are communicated with each other using the allocated emergency call transmission resource. The eighth sub-frame is divided into two sections one of which is for transmission and other of which is for reception. For example, the relay mobile station 220 may use the divided two sections of the eighth sub-frame as a transmission slot Tx and a reception slot Rx, in order. Accordingly, the emergency caller 210 may use the divided two sections of the eighth sub-frame as a reception slot Rx and a transmission slot Tx, in order.

As described above, if part of the transmission resource is allocated to an emergency call transmission resource, the emergency caller 210 transmits a signal to the relay mobile station 220 via a transmission slot Tx of a corresponding emergency call transmission resource. The relay mobile station 220 receives the signal from the emergency caller 210 via a reception slot Rx, and then transmits the received signals to the serving base station 110 via an up link frame. The relay mobile station 220 may receive a signal from the serving base station 110 via a down link frame and then transmit the received signal to the emergency caller 210 via a transmission slot Tx.

When an emergency call is performed as described above, an inter-cell interference may occur in a cell that is allocated to the transmission resource for an emergency call. In the following description, an emergency call method, according to an embodiment of the present invention, is explained in detail, as follows, reducing inter-cell interference.

Figure 5:
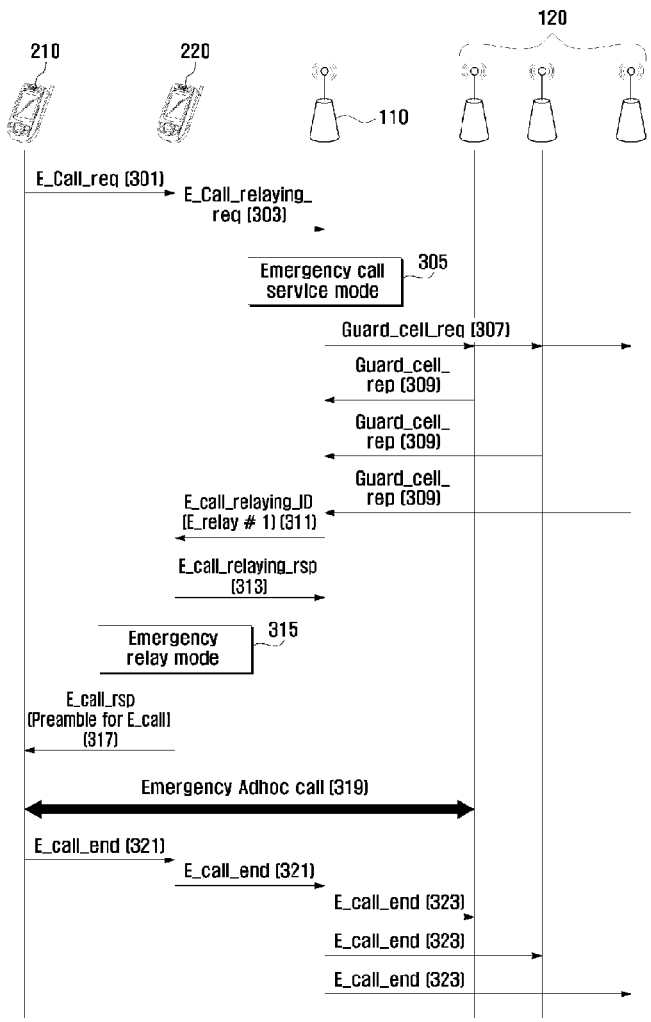
FIG. 5 is a signal flow chart describing a method for performing an emergency call in a wireless communication system, according to an embodiment of the present invention.

FIG. 5 is a signal flow chart describing a method for performing an emergency call in a wireless communication system, according to an embodiment of the present invention.

Referring to FIG. 5, in order to receive services from base stations 110 and 120, one of the mobile stations 210 and 220 must acquire a synchronous signal therefrom and receive allocated transmission resources therefrom. For example, an emergency caller 210 cannot receive a preamble from any of the base stations 110 and 120 in a wireless communication system so it is in a state where it cannot acquire a synchronous signal therefrom.

In that case, the emergency caller 210 transmits an emergency call requesting signal E_call_req to ambient mobile stations (301). The ambient mobile stations means a mobile station, i.e., the mobile station 220 that is in a cell.

It is preferable that the emergency call requesting signal E_call_req may be transmitted to a synchronization channel (SCH). That is, the mobile station 200 in a cell can receive such an emergency call requesting signal E_call_req via a synchronization channel. The synchronization channel may be a broadcasting channel. Due to this, the synchronization channel can suffer from inter-cell interference of the base stations 120. However, since the synchronization channel is a down link section, it is not subject to interference from other mobile stations in the cell. Therefore, in an environment including a variety of cells, receiving the emergency call request signal is not subjected to interference.

There is at least one mobile station that has received an emergency call requesting signal E_call_req, for example, the relay mobile station 220. The relay mobile station 220 transmits an emergency call request relaying signal E_call_relaying_req to its serving base station 110 (303).

The serving base station 110 having received the emergency call request relaying signal E_call_relaying_req is operated in an emergency call service mode and schedules an emergency call (305). In this stage, the serving base station 110 may use a preset frame for an emergency call transmission resource for the emergency call. However, it receives the emergency call request and then can newly allocate the resource therefor. The allocation of the emergency call transmission resource has been described above, referring to FIG. 2, FIG. 3 and FIG. 4.

After that, the serving base station 110 transmits a guard cell request signal Guard_cell_req to ambient base stations 120, requesting that they do not use a frame allocated to an emergency call transmission resource (307). The guard cell request signal Guard_cell_req is to prevent inter-cell interference and may be transmitted to ambient base stations in a range of one hop of the serving base station 110. This is because inter-cell interference rarely occurs in signals of the ambient base stations outside the range of one hop of the serving base station 110.

The guard cell request signal Guard_cell_req includes information regarding a frame that is allocated as an emergency call transmission resource by the serving base station 110. The ambient base stations 120 having received the guard cell request signal Guard_cell_req do not use the frame indicated by the guard cell request signal.

After receiving the guard cell request signal Guard_cell_req, the ambient base stations 120 transmit a guard cell response signal Guard_cell_rep as an acknowledgement to the serving base station 110 (309).

The serving base station 110 transmits a relay request identifier E_call_relaying_ID to the relay mobile station 220 and allocates an emergency call transmission resource thereto (311).

The relay request identifier E_call_relaying_ID includes an identifier for identifying an emergency call service and location information regarding an emergency call transmission resource. It may be an indicator that allows a relay mobile station to relay an emergency call.

After receiving the relay request identifier E_call_relaying_ID, the relay mobile station 220 transmits a relay request response E_call_relaying_rsp to the serving base station 110 (313).

After that, the relay mobile station 220 switches its current mode to an emergency call relay mode (315). The relay mobile station 220 is synchronized with the emergency caller 210 and then receives a signal therefrom. The relay mobile station 220 also transmits a signal from the emergency caller 210 to the serving base station 110 and a signal from the serving base station 110 to the emergency caller 210.

In an embodiment of the present invention, if one of the sub-frames is used for a transmission resource for an emergency call, it is divided into an up link slot and an down link slot between the relay mobile station 220 and the emergency call 210 and then they are used for the emergency call.

To this end, the relay mobile station 220 transmits an emergency call response signal E_call_rsp to the emergency caller 210 (317). The emergency call response signal E_call_rsp includes a preamble, used so that the emergency caller 210 is synchronized with the relay mobile station 220, and information regarding an emergency call transmission resource, used between the emergency caller 210 and the relay mobile station 220.

After receiving a preamble from the relay mobile station 220, the emergency caller 210 acquires synchronization of the relay mobile station 220 through the preamble and then detects the allocated emergency call transmission resource according to the acquired synchronization. The relay mobile station 220 notifies the emergency caller 210 of the location of the emergency call transmission resource through an MAP transmitted after the preamble, so that the emergency caller 210 can detect the frame location of the emergency call transmission resource through the MAP.

After that, the emergency caller 210 is communicated via the relay mobile station 220 with the serving base station 110 using the frame allocated to the emergency call transmission resource (319).

After terminating the emergency call, the emergency caller 210 transmits an emergency call end signal E_call_end to the serving base station 110 via the relay mobile station 220 (321).

The serving base station 110 transmits the emergency call end signal E_call_end to the ambient base stations 120 to inform that the emergency call service has been terminated (323). The ambient base stations 120 can use transmission resources that they have not been used to guide an area for the emergency call resource.

As described above, in order to provide an emergency call service, the serving base station transmits a guard cell request signal Guard_cell_req to its ambient base stations, requesting that they do not use an emergency call transmission resource, thereby preventing inter-cell interference that will occur if they use the emergency call transmission resource.

In the following description, a method for performing an emergency call service in a base station is explained in detail with reference to FIG. 6.

Figure 6:
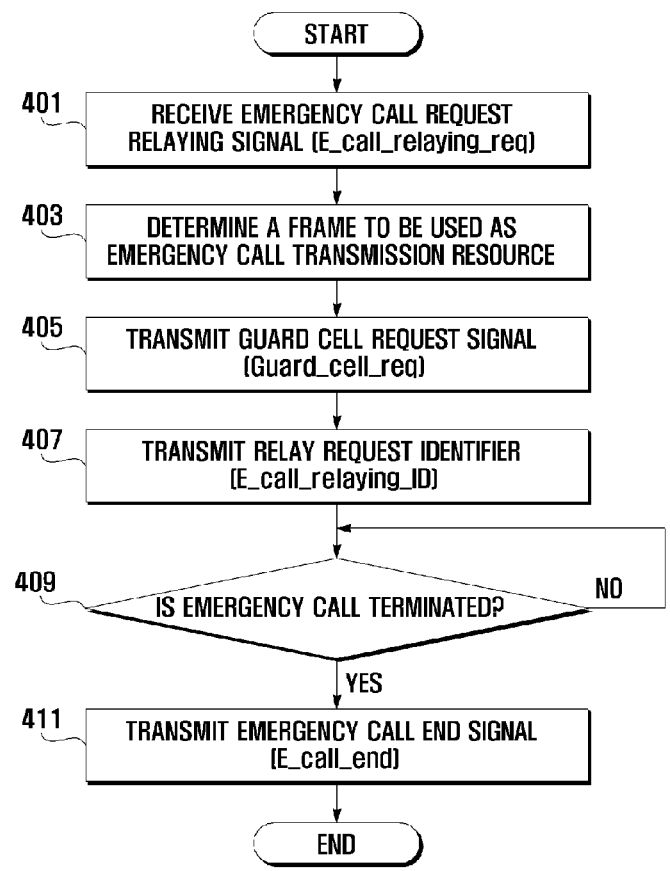
FIG. 6 is a flow chart describing a method for performing an emergency call service in a base station according to an embodiment of the present invention.

FIG. 6 is a flow chart describing a method for performing an emergency call service in a base station according to an embodiment of the present invention.

Referring to FIG. 6, when an emergency caller transmits an emergency call requesting signal E_call_req to a relay mobile station, the relay mobile station transmits an emergency call request relaying signal E_call_relaying_req to its serving base station 110.

The serving base station 110 receives the emergency call request relaying signal E_call_relaying_req (401). The serving base station 110 switches its current mode to an emergency call service mode. The serving base station 110 determines a frame to be used as an emergency call transmission resource (403). The serving base station 110 may use a preset frame (a sub-frame) as an emergency call transmission resource. For example, when the serving base station 110 is initially accessed by the relay mobile station 220, it may inform the relay mobile station 220 of the emergency call transmission resource through system information. After being switched to an emergency call service mode, the serving base station 110 can allocate the emergency call transmission resource by scheduling. As shown in FIG. 2, FIG. 3 and FIG. 4, the emergency call transmission resource can use at least one of the sub-frames.

After that, the serving base station 110 transmits a guard cell request signal Guard_cell_req to the ambient base stations 120 so that they do not use the frame (sub-frame) that is determined as an emergency call transmission resource (405). The guard cell request signal Guard_cell_req is to prevent inter-cell interference and may be transmitted to ambient base stations in a range of one hop of the serving base station 110.

The guard cell request signal Guard_cell_req includes information regarding a frame that is allocated as an emergency call transmission resource by the serving base station 110. The ambient base stations 120 having received the guard cell request signal Guard_cell_req do not use the frame indicated by the guard cell request signal.

After receiving the guard cell request signal Guard_cell_req, the ambient base stations 120 transmit a guard cell response signal Guard_cell_rep as an acknowledgement to the serving base station 110.

The serving base station 110, having received the guard cell response signal Guard_cell_rep from the ambient base stations 120, transmits a relay request identifier E_call_relaying_ID to the relay mobile station 220, so that the relay mobile station 220 can use the determined emergency call transmission resource (407).

The relay request identifier E_call_relaying_ID includes an identifier for identifying an emergency call service and location information regarding an emergency call transmission resource. It may be an indicator that allows a relay mobile station 220 to relay an emergency call.

After receiving the relay request identifier E_call_relaying_ID, the relay mobile station 220 transmits a relay request response E_call_relaying_rsp to the serving base station 110. After that, the relay mobile station 220 switches its current mode to an emergency call relay mode. The relay mobile station 220 is synchronized with the emergency caller 210 and then receives a signal therefrom. The relay mobile station 220 also transmits a signal from the emergency caller 210 to the serving base station 110 and a signal from the serving base station 110 to the emergency caller 210.

To this end, if one of the sub-frames is used for a transmission resource for an emergency call, the relay mobile station 220 and the emergency caller 210 are synchronized with each other, and the one sub-frame is divided into an up link slot and a down link slot so that the slots can be used for the emergency call.

When such an emergency call is terminated, the emergency caller 210 transmits an emergency call end signal E_call_end to the serving base station 110 via the relay mobile station 220, so that the serving base station 110 can ascertain that the emergency call has been terminated.

The serving base station 110 determines whether the emergency call has been terminated (409). If the serving base station 110 ascertains that the emergency call has been terminated at 409, it transmits an emergency call end signal E_call_end to the ambient base station 120, informing that the emergency call service has been terminated (411). The ambient base stations 120 can use transmission resources that they have not been used to guide an area for the emergency call resource.

As described above, according to the embodiment of the present invention, when the serving base station receives an emergency call request, it allocates a transmission resource for an emergency call (i.e., an emergency call transmission resource) so as not to use the allocated emergency call transmission resource in its ambient base stations, thereby preventing inter-cell interference when the emergency call is performed.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

Since the system and method, according to the present invention, can prevent inter-cell interference when an emergency caller performs an emergency call with the relay mobile station and the base station of the relay mobile station, they can be variously applied to wireless communication systems where the mobile stations need to perform direct communication with each other.

The invention claimed is:

1. A wireless communication system for performing an emergency call, the system comprising:
   an emergency call mobile station for sending an emergency call request;
   a relay mobile station for sending an emergency call request relaying signal when receiving the emergency call request and communicating with the emergency call mobile station using an allocated emergency call transmission resource; and
   a serving base station for receiving the emergency call request relaying signal via the relay mobile station, allocating the emergency call transmission resource, sending a guard cell request signal to ambient base stations for the ambient base stations to not use the allocated emergency call transmission resource, and notifying the relay mobile station of the allocated emergency call transmission resource,
   wherein the guard cell request signal comprises information of the allocated emergency call transmission resource.

2. The system of claim 1, wherein:
   the emergency call transmission resource is one of a plurality of sub-frames; and
   the relay mobile station and the emergency call mobile station divide the one sub-frame into up link and down link slots and perform the emergency call using the up link and down link slots.

3. The system of claim 1, wherein the emergency call mobile station sends the emergency call request via a synchronization channel.

4. The system of claim 1, wherein the serving base station notifies the relay mobile station of the allocated emergency call transmission resource by sending a relay request identifier including an identifier for identifying an emergency call service and location information regarding an emergency call transmission resource.

5. A method for performing an emergency call in a wireless communication system, the method comprising:
   sending, by a relay mobile station, an emergency call request relaying signal when receiving an emergency call requested by an emergency call mobile station;
   receiving, by a serving base station, the emergency call request relaying signal, allocating an emergency call transmission resource, and sending a guard cell request signal to ambient base stations for the ambient base stations to not use the allocated emergency call transmission resource; and
   allocating, by the serving base station, the emergency call transmission resource to the relay mobile station, and performing an emergency call service,
   wherein the guard cell request signal comprises information of the allocated emergency call transmission resource.

6. The method of claim 5, wherein the emergency call transmission resource is one of a plurality of sub-frames, and wherein performing an emergency call service comprises:
   dividing, by the relay mobile station and the emergency call mobile station, the one sub-frame into up link and down link slots; and
   performing the emergency call using the up link and down link slots.

7. The method of claim 5, wherein the emergency call mobile station sends the emergency call request via a synchronization channel.

8. The method of claim 5, wherein the serving base station notifies the relay mobile station of the allocated emergency call transmission resource by sending a relay request identifier including an identifier for identifying an emergency call service and location information regarding an emergency call transmission resource.

9. A method for performing emergency communication in a base station, the method comprising:
   receiving an emergency call request relaying signal;
   allocating an emergency call transmission resource;
   sending a guard cell request signal to ambient base stations for the ambient base stations to not use the allocated emergency call transmission resource;
   receiving a guard cell response signal from the ambient base stations in response to the guard cell request signal; and
   providing an emergency call service using the allocated emergency call transmission resource,
   wherein the guard cell request signal comprises information of the allocated emergency call transmission resource.

10. The method of claim 9, wherein the emergency call transmission resource is one of a plurality of sub-frames.

11. The method of claim 9, further comprising:
    sending a relay request identifier including an identifier for identifying an emergency call service and location information regarding the emergency call transmission resource to a relay mobile station for notifying the allocated emergency call transmission resource.

12. A method for performing emergency communication in an emergency call mobile station, the method comprising:
- sending an emergency call request signal to a relay mobile station;
- receiving, from the relay mobile station, an emergency call response signal comprising information of an emergency call transmission resource allocated by a base station; and
- communicating via the relay mobile station with the base station using the emergency call transmission resource,
- wherein the information of an emergency call transmission resource is transmitted by the base station to ambient base stations for the ambient base stations to not use the allocated emergency call transmission resource.

13. The method of claim 12, wherein the emergency call transmission resource is one of a plurality of sub-frames.

14. The method of claim 12,
- wherein sending the emergency call request signal comprises sending the emergency call request signal to the relay mobile station via a synchronization channel.

15. The method of claim 13,
- wherein communicating via the relay mobile station with the base station comprises dividing the one sub-frame into up link and down link slots and communicating via the relay mobile station with the base station using the up link and down link slots.

16. A method for performing emergency communication in a relay mobile station, the method comprising:
- receiving an emergency call request signal from an emergency call mobile station;
- sending an emergency call request relaying signal to a base station;
- receiving information of the emergency call transmission resource allocated by the base station; and
- sending, to the emergency call mobile station, an emergency call response signal comprising the information of the emergency call transmission resource allocated by the base station,
- wherein the information of an emergency call transmission resource is transmitted by the base station to ambient base stations for the ambient base stations to not use the allocated emergency call transmission resource.

17. The method of claim 16, wherein the emergency call transmission resource is one of a plurality of sub-frames.

18. The method of claim 16,
- wherein the receiving the emergency call request signal comprises receiving the emergency call request signal from the emergency call mobile station via a synchronization channel.

19. The method of claim 17, further comprising:
dividing the one sub-frame into up link and down link slots and performing an emergency call using the up link and down link slots.

20. The method of claim 17,
- wherein the receiving information of the emergency call transmission resource comprises receiving a relay request identifier including an identifier for identifying an emergency call service and location information regarding the emergency call transmission resource from the base station.

21. A base station for performing emergency communication, the base station comprising:
- a transceiver for transmitting and receiving a signal; and
- a controller for receiving an emergency call request relaying signal, allocating an emergency call transmission resource, sending a guard cell request signal to ambient base stations for the ambient base stations to not use the allocated emergency call transmission resource, receiving a guard cell response signal from the ambient base stations in response to the guard cell request signal and providing an emergency call service using the allocated emergency call transmission resource,
- wherein the guard cell request signal comprises information of the allocated emergency call transmission resource.

22. The base station of claim 21, wherein the emergency call transmission resource is one of a plurality of sub-frames.

23. The base station of claim 21,
- wherein the controller further sends a relay request identifier including an identifier for identifying an emergency call service and location information regarding the emergency call transmission resource to a relay mobile station for notifying the allocated emergency call transmission resource.

24. An emergency call mobile station for performing emergency communication, the emergency call mobile station comprising:
- a transceiver for transmitting and receiving a signal; and
- a controller for sending an emergency call request signal to a relay mobile station, receiving, from the relay mobile station, an emergency call response signal comprising information of an emergency call transmission resource allocated by a base station and communicating via the relay mobile station with a base station using the emergency call transmission resource,
- wherein the information of an emergency call transmission resource is transmitted by the base station to ambient base stations for the ambient base stations to not use the allocated emergency call transmission resource.

25. The emergency call mobile station of claim 24, wherein the emergency call transmission resource is one of a plurality of sub-frames.

26. The emergency call mobile station of claim 24,
- wherein the controller further sends the emergency call request signal to the relay mobile station via a synchronization channel.

27. The emergency call mobile station of claim 25,
- wherein the controller further divides the one sub-frame into up link and down link slots and communicating via the relay mobile station with the base station using the up link and down link slots.

28. A relay mobile station for performing emergency communication, the relay mobile comprising:
- a transceiver for transmitting and receiving a signal; and
- a controller for receiving an emergency call request signal from an emergency call mobile station, sending an emergency call request relaying signal to a base station, receiving information of the emergency call transmission resource allocated by the base station and sending, to the emergency call mobile station, an emergency call response signal comprising the information of the emergency call transmission resource allocated by the base station,
- wherein the information of an emergency call transmission resource is transmitted by the base station to ambient base stations for the ambient base stations to not use the allocated emergency call transmission resource.

29. The method of claim 28, wherein the emergency call transmission resource is one of a plurality of sub-frames.

30. The method of claim 28,
- wherein the controller further receives the emergency call request signal from the emergency call mobile station via a synchronization channel.

31. The method of claim 29,
wherein the controller further divides the one sub-frame into up link and down link slots and performs an emergency call using the up link and down link slots.

32. The method of claim 28, wherein the controller further receives a relay request identifier including an identifier for identifying an emergency call service and location information regarding the emergency call transmission resource from the base station.

* * * * *